Patented Sept. 5, 1933

1,925,628

UNITED STATES PATENT OFFICE

1,925,628

NONALKALINE CHLORATE WEED KILLER

Ralph N. Chipman, Bound Brook, N. J., assignor to Chipman Chemical Company, Inc., Middlesex, N. J., a corporation of New York No Drawing. Application December 22, 1928
Serial No. 328,068

13 Claims. (Cl. 167—45)

This invention proposes an economical weed-killing agent of greater herbicidal efficiency than has heretofore been available, and it is based on the discovery that the lethal action of commercial chlorate herbicides may be distinctively accelerated by sufficiently increasing their hydrogen ion concentration.

8.1 is the pH value of a solution (of commercial sodium chlorate) of the strength customarily used in the art, to wit, 1 lb. of the solid chlorate to one gallon of water. It is well recognized that such a solution, when sprayed on plants, will effectively destroy them. This is 1.1 points above the neutral point or, so to speak, such a solution is slightly alkaline. By adding a compatible agent (of a pH value lower than 7.0) until the solution acquires acid characteristics, its herbicidal efficiency will be notably enhanced. My investigations indicate that, by so doing, various desirable results are effected; to wit:

1. Increasing the assimilation of the compound by the plant by eliminating the physiological resistance of the plant to the absorption of alkaline materials.

2. Establishing a less stable attachment of the chloric acid radical ($ClO_3$) in an adjusted ionized solution.

3. Combining such elements of the electromotive series as will provide the desired ionized condition effectively and practically.

4. Developing a higher electro-motive pressure with the ionized chlorate weed killing compound.

In carrying out this invention, a relatively wide range of additive agents are equivalently available; to wit, acids (organic and inorganic) exemplified by hydrochloric, sulphuric, nitric, boric, oxalic, tartaric, etc.; acid salts exemplified by sodium acid sulphate, potassium acid tartrate, mono calcium phosphate, etc., and salts which hydrolize in the manner of the chloride of ammonium, aluminum, trivalent iron or copper, sodium-fluosilicate, etc. The proportion, however, so added should in no case be sufficient to liberate any appreciable amount of chlorine otherwise a solution corrosive to a detrimental extent will result. In general the added agent should be in an amount sufficient to render the solution sensitive so to speak, but not in an amount sufficient to result in spontaneous decomposition whereby chlorine is prematurely liberated with the attendant corrosion of the containers and ultimate loss of the direct weed-killing factor and thereby loss of efficiency. The precise proportion suitable for a given sample of commercial sodium chlorate must needs be qualified by the nature and amounts of the impurities in the commercial product. These impurities are, generally speaking, of an alkaline nature, being usually oxides or hydroxyls of magnesium, sodium, potassium, barium calcium, etc., and their aggregate effect is to impart a distinctly alkaline characteristic to a solution of such sodium chlorate as can be obtained in commerce. Sufficient of the agent must be added, pursuant to the dictates of this invention, to reduce the pH value below 7.0 but not sufficiently low to cause any appreciable premature decomposition of the chlorate. Thereby, the chlorate is sensitized, speaking from an herbicidal viewpoint. This characteristic of alkalinity is particularly marked in chlorates of a relatively strong base such as the alkalins or alkaline earths.

The rationale of chemical weed killing is necessarily obscure on account of our imperfect knowledge of plant physiology, but my observations and studies have led me to certain conclusions which apparently indicate reasons why this invention so materially enhances the efficiency of chlorate weed-killers.

Water, light, $CO_2$ and air, through a process of photo synthesis, combine in recurring cycles to produce the carbohydrates (first sugar and then starch) which, together with certain minerals drawn from the soil, go to create the plant tissues. Any suspension or retardation of this cycle results in a starvation of the plant which continues for a while to exist on its reserve of starch and then dies from exhaustion. It has been demonstrated by successive microscopic examinations of the plant cells, that chlorates exercise that influence. It has likewise been clearly demonstrated that, upon applying a chlorate to a plant, it apparently continues to exist for a while but becomes gradually more and more emaciated and ultimately dies. All chlorates are accordingly weed-killers of high efficiency compared with other types and, because of being non-poisonous to animal life, have substantially displaced all others.

All such chlorates, as has been previously stated, are commercially available only with a more or less alkaline reaction. My discovery that, by making them non-alkaline their normal efficiency is still further increased, is difficult to explain. Weed juices and saps are acid in nature and results seem to indicate that the assimilation of the applied chlorate mixture is greatly facilitated when the latter is of a like nature—in other words acid or non-alkaline. That an acidulated herbicide is more lethal than one alkaline can be assumed to be more lethal than one alkaline, and this can be confirmed as an emphatic fact by comparative tests.

Other considerations render it desirable that the herbicide shall not, however, be too strongly acid; otherwise, the chlorate will be too unstable, free chlorine to an excessive degree will be liberated, and the containers and spray-apparatus will be unduly corroded. This means that, if the commercially alkaline chlorate be acidulated with any additive agent capable of ionizing to a great degree, such as a strong acid, the operation must be performed with extreme caution and under precise control. To do so in a commercial way would be irksome and involve expense.

An important object of this invention is to avoid this difficulty. This is accomplished by employing weakly-acid additive agents, i. e. of a comparatively high pH value. This will be perceived by the following examples in which without greatly lowering the resultant pH value a considerable range of typical agents were added to a solution of calcium chlorate containing 12 grams per 100 cubic centimeters.

| Added substance | Quantity added | pH |
| --- | --- | --- |
| Zinc chloride (ZnCl$_2$) | 1% | 7.1 |
|  | 2 | 6.6+ |
|  | 5 | 6.4+ |
| Copper chloride (CuCl$_2$) | 1% | 5.2 |
|  | 2 | 5.1+ |
|  | 5 | 5.1 |
| Mercuric chloride (HgCl) | 1% | 7.6 |
|  | 2 | 7.6 |
|  | 5 | 7.5+ |
| Boric acid (H$_3$BO$_3$) | 1% | 7.0 |
|  | 2 | 6.6 |
|  | 5 | 6.2 |

It is noteworthy also that the osmotic pressures of chlorate solutions are increased by means of acidulating additive agents. The higher the osmotic pressure, the more may the solution be expected to pass through the membranes of the plant cells and hence become effective to retard the life cycle by liberating the destructive chloric acid radical.

What has been said in the foregoing with respect to solutions of sodium chlorate applies likewise to the improved weed-killer set forth in my United States Patent granted on December 4, 1928, No. 1,694,205. This is formed by first adding calcium chloride to a solution of sodium chlorate to produce calcium chlorate and sodium chloride.

Given an ionized solution of the salts of calcium chlorate, sodium chloride, calcium chloride and sodium chlorate containing sodium, calcium, chlorine, chloric acid and possibly hydrogen oxygen ions, we also have impurities of hydroxyl ions which produce an alkaline solution of these chlorates and chlorides which for weed killing purposes are too tightly bound because of this alkalinity for rapid, efficient and complete liberation of chloric acid on plants by carbonic acid or light and show a hydrogen ion concentration of eight to nine whereas it is desirable to have a hydrogen ion concentration below seven, the neutral point for this purpose.

Therefore, to increase the hydrogen ion concentration we add a soluble metallic chloride, the base being below barium in the electro motive series or other equivalents which cause a neutralization of hydroxyl ions and an excess of hydrogen ions in the solution resulting in an acidity or hydrogen ion concentration below the neutral point.

The effect of adding various acidulating agents to such a solution of calcium chlorate is to increase the hydrogen ion concentrations as follows:

| Added substance | Quantity added | pH |
| --- | --- | --- |
| ZnCl$_2$ | 0.1% | 7.8 |
|  | 0.2 | 7.3 |
|  | 0.7 | 6.9 |
| AlCl$_3$ | 1% | 5.0 |
|  | 5 | 4.2 |
| FeCl$_3$ | 1% | Approx. 2 |
|  | 5 | Approx. 2 |
| Na$_2$Cr$_2$O$_7$ | 1% | 6± |
|  | 5 | 5.6 |
| HCl | 0.2% | 2.4 |
| CaH$_4$(PO$_4$)$_2$ | 1% | 4.9 |
|  | 2 | 4.9 |

The practical utility consists in greatly increasing the herbicidal efficiency of the weed-killer.

I therefore claim:

1. An herbicidal solution of a chlorate having a pH value less than seven but not strongly acidulous.

2. A solution defined by claim 1 which contains a metallic acid salt.

3. The method of increasing the herbicidal efficiency of a chlorate weed killer which consists in adding thereto an agent adapted to lower its pH value in an amount sufficient to render the weed killer weakly acid.

4. A herbicidal mixture consisting primarily of a chlorate with the addition thereto of zinc chloride in sufficient quantity to produce a slightly acidulous final mixture.

5. An herbicidal solution of a chlorate having a pH value less than seven but within the range where it is only weakly acidulous.

6. The method of killing weeds which consists in subjecting the foliage thereof to the action of a chlorate-bearing material which is non-alkaline.

7. The method of increasing the herbicidal efficiency of a weed killer prepared from a chlorate which consists in associating therewith an acid substance in sufficient quantity to render the mixture non-alkaline but not in an amount sufficient spontaneously to decompose the chlorate.

8. The method of killing weeds which consists in subjecting the foliage thereof to the action of a non-alkaline material bearing the chlorate of a relatively strong base.

9. A weed killer comprised of a chlorate and an acid agent adapted and in sufficient quantity to reduce the normal stability of the chlorate and render it sensitive to decomposition.

10. A weed killer comprised of a chlorate of a relatively strong base and an acid agent adapted and in sufficient quantity to reduce the normal stability of the chlorate and render it sensitive to decomposition.

11. The method of increasing the herbicidal efficiency of a weed killer prepared from a chlorate of a relatively strong base which consists in associating therewith an acid substance in sufficient quantity to render the mixture non-alkaline but not in an amount sufficient spontaneously to decompose the chlorate.

12. A weed killer comprised of a chlorate and a compatible acid agent associated therewith in sufficient quantity to render the mixture non-alkaline but not in an amount sufficient spontaneously to decompose the chlorate in solution.

13. A weed killer comprised of an alkaline chlorate and a compatible acid agent associated therewith in sufficient quantity to render the mixture non-alkaline but not in an amount sufficient spontaneously to decompose the chlorate in solution.

RALPH N. CHIPMAN.